(12) United States Patent
Fujita et al.

(10) Patent No.: US 6,396,175 B2
(45) Date of Patent: May 28, 2002

(54) DIRECT CURRENT MOTOR

(75) Inventors: Youichi Fujita; Sotsuo Miyoshi; Toshihiko Miyake; Satoshi Kawamura, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/906,069

(22) Filed: Jul. 17, 2001

Related U.S. Application Data

(63) Continuation of application No. PCT/JP99/06455, filed on Nov. 18, 1999.

(51) Int. Cl.$^7$ .......................... H02K 11/00; H02K 13/04
(52) U.S. Cl. .......................... 310/51; 310/68 D; 310/249
(58) Field of Search .............................. 310/68 R, 68 C, 310/68 D, 248, 249, 233, 234, 51

(56) References Cited

U.S. PATENT DOCUMENTS

| | | | |
|---|---|---|---|
| 5,796,203 A | * 8/1998 | Wang | 310/233 |
| 5,895,990 A | * 4/1999 | Lau | 310/51 |
| 5,905,319 A | 5/1999 | McLendon | 310/68 R |

FOREIGN PATENT DOCUMENTS

| | | | |
|---|---|---|---|
| JP | 7-107709 | 4/1995 | H02K/13/00 |
| JP | 11-168851 | 6/1999 | H02K/5/22 |

* cited by examiner

*Primary Examiner*—Nicholas Ponomarenko
*Assistant Examiner*—Judson H. Jones
(74) *Attorney, Agent, or Firm*—Sughrue Mion, PLLC

(57) ABSTRACT

A direct current motor according to the present invention is provided with a stator 2 in which coils 4 corresponding to N phases are arranged almost at equal intervals in a circle-circumferential direction of stator cores 3, a rotor 8 in which a plurality of permanent magnets 9 are respectively arranged at positions corresponding to the coils 4 of the stator 2, and a current carrying device, having a commutator 11, for commutating direct current supplied from a power source to N-phase current in cooperation with the rotor 8 and carrying the N-phase current to each coil of the stator 2. In the internal space of the current carrying device, a plurality of noise eliminating members 23 connected with a plurality of brush holding plates corresponding to the coil phases are arranged.

3 Claims, 5 Drawing Sheets

DIRECT CURRENT MOTOR

CROSS-REFERENCE TO THE RELATED APPLICATION

This application is a continuation of International Application No. PCT/JP99/06455, whose International filing date is Nov. 18, 1999, which was published under PCT article 21 (2) in Japanese, the disclosures of which Application are incorporated by reference herein.

BACKGROUND OF THE INVENTION

1. Field of the Invention

The present invention relates to a direct current motor appropriate to an exhaust gas recycle valve device in which the direct current motor is used for a vehicle height adjusting device or an exhaust gas recycle system mounted in a vehicle.

2. Description of Related Art

Published Unexamined Japanese Patent Application No. H11-168851 (1999) discloses a known direct current motor. This type direct current motor is principally composed of a rotor, a stator functioning as a case for surrounding the rotor and a commutator. Coils are arranged in the rotor, a plurality of permanent magnets arranged at equal intervals are tightly fitted to an inner peripheral face of the rotor, and the commutator can be coaxially rotated together with the rotor. Also, noise eliminating parts such as condensers, varistors and the like are arranged to eliminate noise generated in a motor drive operation. For this reason, these components are arranged between terminals functioning as an electric power supplying unit of the direct current motor.

However, because the conventional direct current motor has the above-described structure, there is a problem that the noise generated in the motor drive operation cannot be sufficiently eliminated.

SUMMARY OF THE INVENTION

An object of the present invention is to provide, with due consideration to the drawbacks of the conventional direct current motor, a direct current motor in which a noise eliminating element is arranged to reliably eliminate noise generated in a motor drive operation.

DISCLOSURE OF THE INVENTION

A direct current motor of the present invention comprises a stator in which coils corresponding to N phases are arranged almost at equal intervals in a circle-circumferential direction of stator cores, a rotor in which a plurality of permanent magnets are respectively arranged at positions corresponding to the coils of the stator, and a current carrying device for commutating direct current supplied from a power source to N-phase current in cooperation with the rotor and carrying the N-phase current to each coil of the stator. The direct current motor further comprises a noise eliminating member arranged in an internal space of the current carrying device to be connected with the coils of two coil phases. Accordingly, noise generated in a motor operation time can be reliably eliminated by the noise eliminating members.

In the direct current motor of the present invention, the noise eliminating members are fixed to the current carrying device by adhesive material or by caulking. Therefore, the noise eliminating members can be easily fitted to the current carrying device.

In the direct current motor of the present invention, the current carrying device comprises a plurality of plates, each of which corresponds to one coil phase of the stator, and one noise eliminating member is connected with each pair of plates adjacent to each other. Therefore, noise generated in a motor operation time can be reliably eliminated by the noise eliminating members, and a space between each pair of plates can be effectively used. Therefore, a small-sized direct current motor can be manufactured.

DETAILED DESCRIPTION OF THE PREFERRED EMBODIMENTS

The invention will now be described with reference to the accompanying drawings.

EMBODIMENT 1

Figure 1:
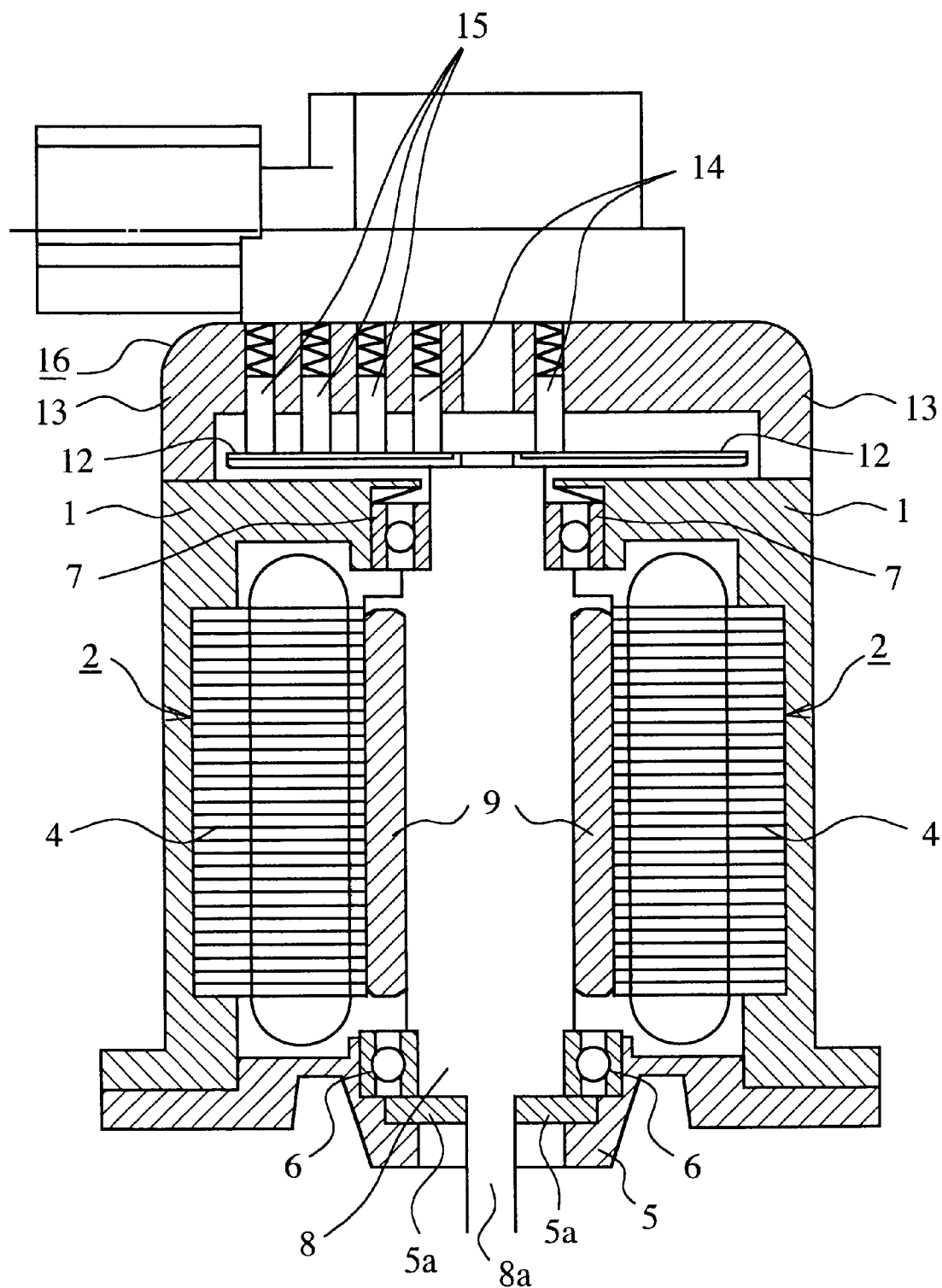
FIG. 1 is a sectional view showing the structure of a direct current motor according to a first embodiment of the present invention.
Figure 2A:
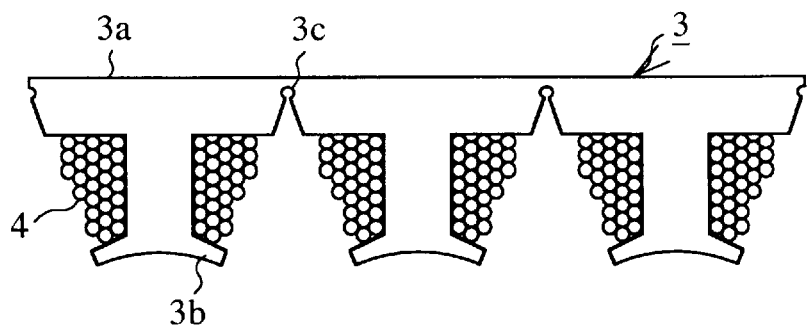
FIG. 2A and FIG. 2B are plan views of the direct current motor shown in FIG. 1 and show a manufacturing method of a stator of the direct current motor.
Figure 2B:
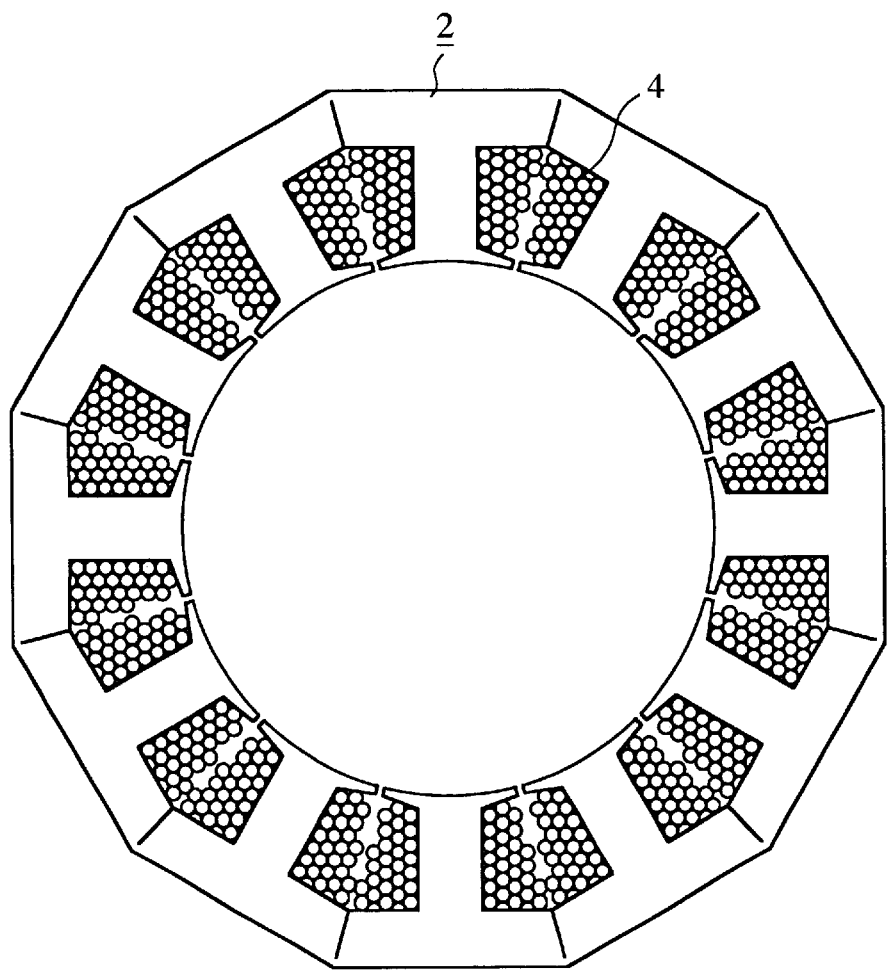
Figure 3:
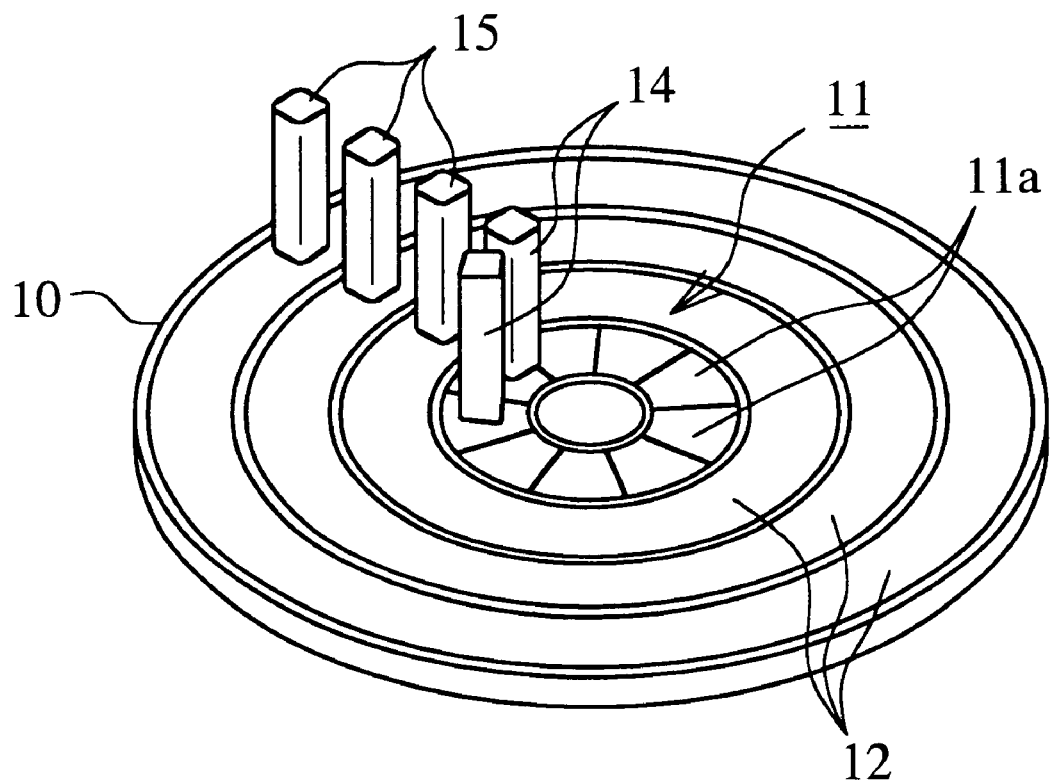
FIG. 3 is a diagonal view showing the structure of a commutator and a plurality of strip rings of a current carrying device shown in FIG. 1.
Figure 4:
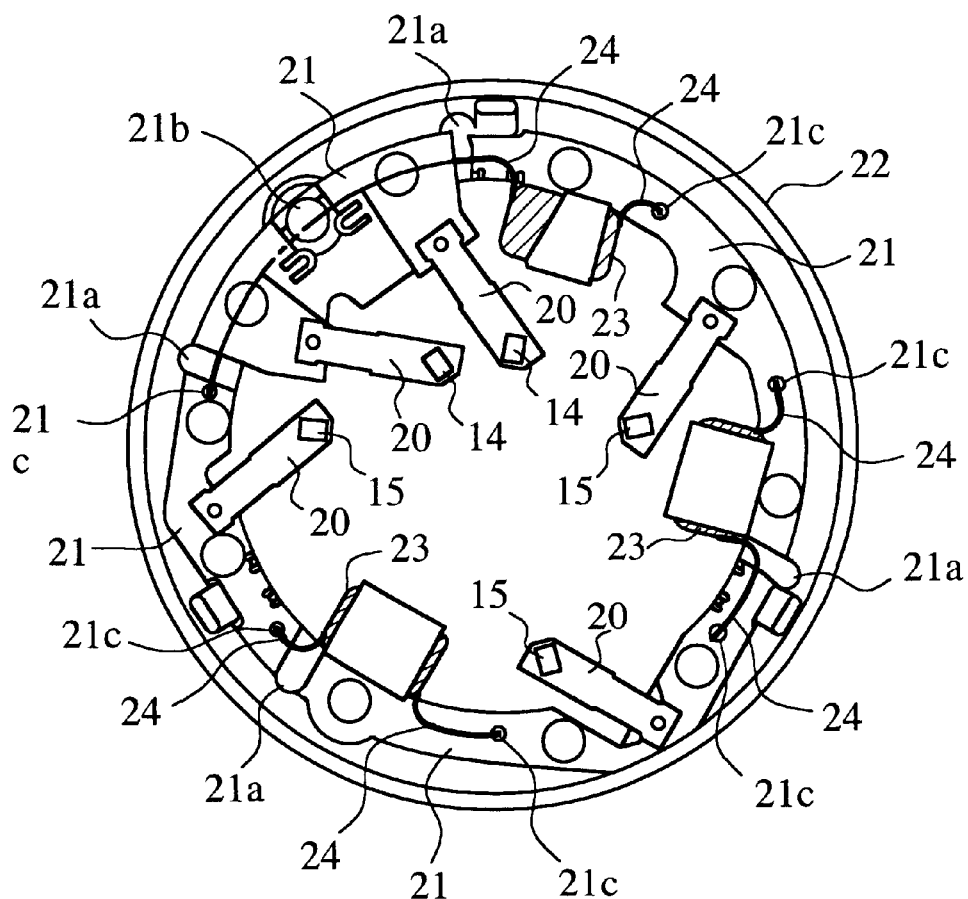
FIG. 4 is a plan view showing a plurality of noise eliminating members arranged at prescribed positions of a stator core of the direct current motor shown in FIG. 1.
Figure 5:
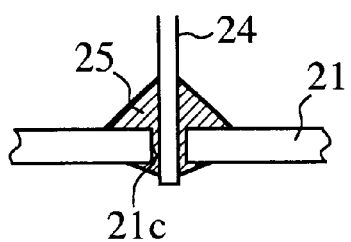
FIG. 5 is a sectional view of connection between each noise eliminating member shown in FIG. 4 and a motor brush holding plate arranged in the stator core as an example.
Figure 6:
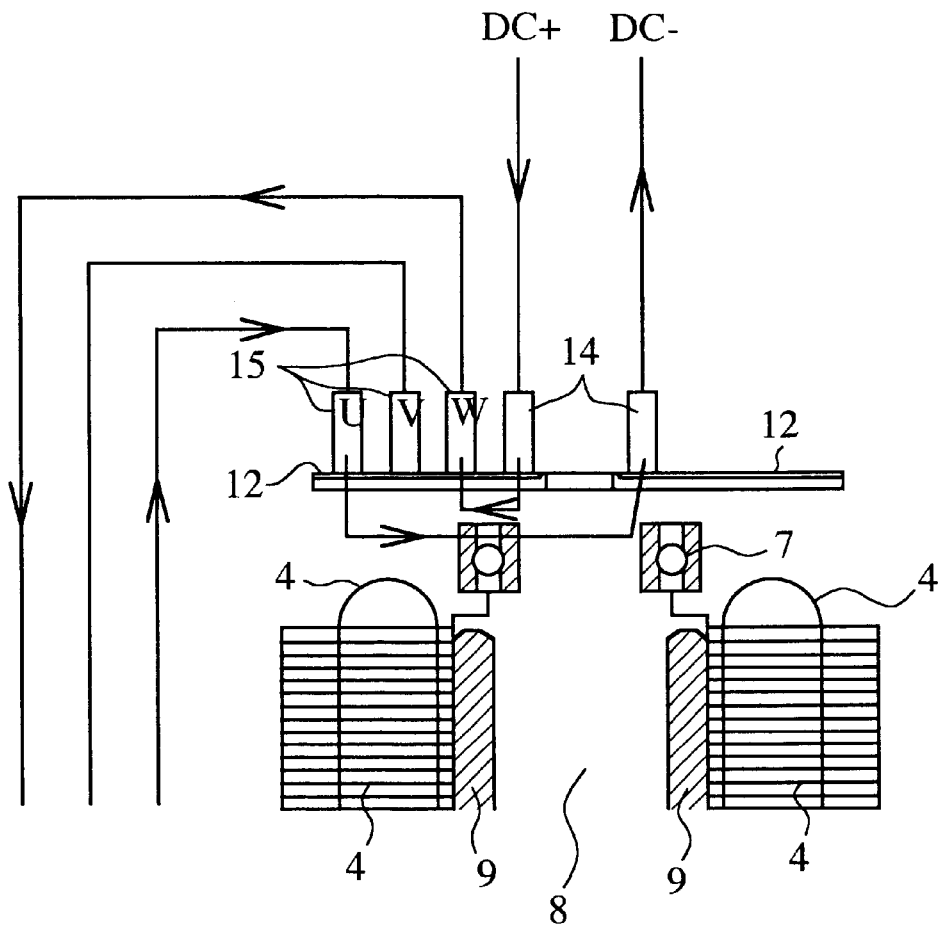
FIG. 6 is a sectional view showing a current flow in the current carrying device of the direct current motor shown in FIG. 1.

FIG. 1 is a sectional view showing the structure of a direct current motor according to a first embodiment of the present invention. FIG. 2A and FIG. 2B are plan views of the direct current motor shown in FIG. 1 and show a manufacturing method of a stator of the direct current motor. FIG. 3 is a diagonal view showing the structure of a commutator and a plurality of strip rings of a current carrying device shown in FIG. 1. FIG. 4 is a plan view showing a plurality of noise eliminating members arranged at prescribed positions of a stator core of the direct current motor shown in FIG. 1. FIG. 5 is a sectional view of connection between each noise eliminating member shown in FIG. 4 and a motor brush holding plate arranged in the stator core as an example. FIG. 6 is a sectional view showing a current flow in the current carrying device of the direct current motor shown in FIG. 1.

In FIG. 1 to FIG. 6, a numeral number 1 indicates a motor case formed of resin material. 2 indicates a stator integrally formed with the motor case 1 by resin molding. As shown in FIG. 2A, each of a plurality of stator cores 3 of the stator 2 is principally composed of a plurality of core pieces 3a, a plurality of magnet teeth 3b respectively projected from a face of the corresponding core piece 3a and a plurality of thin-walled portions 3c respectively connecting two core pieces 3a adjacent to each other. N coils 4 (N is an integral number higher than 1) are respectively wounded on N groups of magnet teeth 3b by using a winding machine (not shown). Thereafter, as shown in FIG. 2B, each thin-walled portion 3c is folded so as to form each stator core 3 in a cylinder shape.

In FIG. 1, 5 is a flange member fitted to one end of the motor case 1, and a boss portion 5a for supporting a bearing 6 is protruded from the central portion of the flange member 5. 7 indicates a bearing which is supported by the other side of the motor case 1, and the bearing 7 is arranged coaxially with the bearing 6. 8 indicates a rotor of which both ends are supported by the bearings 6 and 7 respectively. A plurality of permanent magnet poles 9 are arranged on the outer peripheral face of the rotor 8, and each permanent magnet pole 9 is placed at a position corresponding to the corresponding coil 4 of the stator 2. A motor shaft 8a is protruded from one end of the rotor 8 supported by the bearing 6.

In FIG. 1 and FIG. 3, 10 indicates a circular disk which is fixed to the other end of the rotor 8 so as to be rotated together with the rotor 8. 11 indicates a commutator which is formed by dividing a central ring portion of the circular disk 10 into a plurality of commutator pieces 11a arranged in a circle-circumferential direction of the central ring portion. Direct current supplied from a power source (not shown) is commutated in the commutator pieces 11a to obtain an N-phase current corresponding to N coil phases. 12 indicates a plurality of slip rings which are formed by concentrically and annularly dividing a portion of the circular disk 10 placed on the outer circumference side of the commutator 11 into N portions (three portions in FIG. 3). 13 indicates a bracket fitted to the other end of the motor case 1. 14 indicates a pair of first brushes which are supported by the bracket 13 so as to be insulated from the bracket 13. The top end of each first brush 14 comes in contact with each commutator piece 11a of the commutator 11 under a prescribed pressure so as to be able to slide on the commutator piece 11a. 15 indicates a plurality of second brushes which are supported by the bracket 13 so as to be insulated from the bracket 13. The top end of each second brush 15 comes in contact with the corresponding slip ring 12 under a prescribed pressure so as to be able to slide on the slip ring 12. A current carrying unit 16 is composed of the circular disk 10, the commutator 11, the slip rings 12, the bracket 13, the first brushes 14 and the second brushes 15.

In FIG. 4, 20 indicates each of a plurality of plate spring members. Each of the first brushes 14 and the second brushes 15 is supported on a top portion of one plate spring member 20, each brush 14 or 15 is pushed toward a surface of one commutator piece 11a or a surface of one slip ring 12 by the corresponding plate spring member 20 so as to be able to slide on the surface. 21 indicates each of a plurality of brush holding plates for respectively holding a base end portion of one plate spring member 20. Each brush holding plate 21 corresponds to one coil phase of the stator 2. The pair of first brushes 14 are fixed to one brush holding plate 21 through one plate spring member 20, and the three second brushes 15 are respectively fixed to the other brush holding plates 21 through the plate spring members 20. Therefore, in this first embodiment, there are four brush holding plates 21. These brush holding plates 21 are separated from each other through four separation portions 21a and are fixed to an inner peripheral surface of a brush holding plate fixing member 22 of an annular shape. Therefore, all the brush holding plates 21 are electrically insulated from each other and are mechanically independent from each other.

Also, a cut hole 21b is formed in one brush holding plate 21 to which the pair of first brushes 14 are fixed, and the first brushes 14 are electrically insulated from each other by the cut hole 21b.

A plurality of noise eliminating members 23 are fitted to the brush holding plates 21 to eliminate noise generated in the brushes 14 and 15 in a motor operation time. Each noise eliminating member 23 is, for example, formed of a condenser or a varistor or the like. Two connection terminals 24 of each noise eliminating member 23 are respectively inserted into two connection holes 21c of two brush holding plates 21 different from each other, and each connection terminal 24 is fixed to the corresponding brush holding plate 21 by solder 25 (refer to FIG. 5). That is, each noise eliminating member 23 is connected with two corresponding brush holding plates 21 electrically insulated from each other so as to stride over the separation portion 21a arranged between the brush holding plates 21. Because each brush holding plate 21 corresponds to one coil phase as is described above, each noise eliminating member 23 is substantially connected with one pair of coils 4 corresponding to two coil phases.

Next, an operation of the direct current motor having the structure described above is described.

Initially, as shown in FIG. 6, when direct current supplied from a power source (not shown) flows into one of the first brushes 14, the direct current is commutated in one commutator piece 11 of the commutator 11, passes through one strip ring 12 and is supplied to the stator 2 through one second brush 15. After the commutated current passes through one coil 4, the commutated current passes through another second brush 15, another strip ring 12 and the other commutator piece 11 of the commutator 11 in that order, and the commutated current flows out to the power source though the other first brush 14. In this case, a rotational force is generated in the rotor 8 by the interaction between magnetic flux generated in the coil 4, through which the current flows, and the permanent magnetic poles 9 of the rotor 8, and the circular disk 10 is rotated together with the rotor 8 by the rotational force Therefore, the pair of commutator pieces 11 coming in contact with the pair of first brushes 14 are changed to another pair of commutator pieces 11, and the coil 4, through which the commutated current flows, is changed to another coil 4. As a result, the rotor 8 is continuously rotated.

In this case, because two coils 4 of two coil phases are connected with each other through the corresponding noise eliminating member 23, noise generated in the brushes 14 and 15 and the like can be reliably eliminated by the noise eliminating members 23.

Accordingly, in the first embodiment, because the noise eliminating members 23 are arranged in the neighborhood of a noise generation source such as coils 4, the noise can be efficiently and reliably eliminated.

Also, in the first embodiment, because the connection terminals 24 of the noise eliminating members 23 are fixed to the brush holding plates 21 by solder 25, the fixing operations of the noise eliminating members 23 can be easily performed, a manufacturing efficiency of the direct current motor can be heightened, and a manufacturing cost of the direct current motor can be reduced.

EMBODIMENT 2

Figure 7:
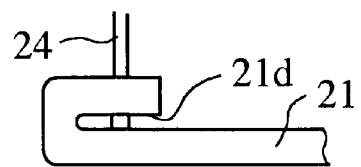
FIG. 7 is a sectional view of connection between each noise eliminating member shown in FIG. 4 and the corresponding motor brush holding plate arranged in the stator core as another example.

FIG. 7 is a sectional view of connection between each noise eliminating member shown in FIG. 4 and the corresponding motor brush holding plate arranged in the stator core as another example. The constitutional elements of a direct current motor according to a second embodiment, which are the same as or equivalent to those according to the first embodiment, are indicated by the same reference numerals as those of the first embodiment, and additional description of the constitutional elements is omitted.

As shown in FIG. 7, features of a direct current motor according to the second embodiment are in that the connection terminals 24 of the noise eliminating members 23 are respectively caulked at caulking portions 21d of the brush holding plates 21 to fix the connection terminals 24 to the brush holding plates 21.

Accordingly, in the second embodiment, because the connection terminals 24 of the noise eliminating members 23 are caulked and fixed, not only the noise can be efficiently and reliably eliminated, but also the fixing operations of the noise eliminating members 23 can be easily performed, a manufacturing efficiency of the direct current motor can be heightened, and a manufacturing cost of the direct current motor can be reduced.

In the first and second embodiments, the noise eliminating members 23 are arranged in three of the four brush holding plates 21. However, it is applicable that one noise eliminating member 23 be arranged in each pair of brush holding plates 21 adjacent to each other. In this case, noise generated in the motor operation time can be more reliably eliminated by the noise eliminating members 23, and a space between each pair of brush holding plates 21 can be effectively used. Therefore, a small-sized direct current motor can be manufactured.

INDUSTRIAL APPLICABILITY

As is described above, in the direct current motor according to the present invention, because the noise generated in the motor operation time can be reliably eliminated by arranging the noise eliminating member between each pair of coils of two coil phases, the motor can be prevented from being erroneously operated due to the noise. Also, because the noise eliminating members are fixed by solder or caulking, the fixing operations of the noise eliminating members can be easily performed, a manufacturing efficiency of the direct current motor can be heightened, and a manufacturing cost of the direct current motor can be reduced. In addition, because one noise eliminating member is arranged in each pair of brush holding plates adjacent to each other, noise generated in the motor operation time can be more reliably eliminated by the noise eliminating members, and a space between each pair of brush holding plates can be effectively used. Therefore, a small-sized direct current motor can be manufactured.

What is claimed is:

1. A direct current motor, comprising
   a stator in which coils corresponding to N phases are arranged almost at equal intervals in a circumferential direction;
   a rotor in which a plurality of permanent magnets are respectively arranged at positions corresponding to the coils of the stator; and
   a current carrying device for commutating direct current supplied from a power source to N-phase current in cooperation with the rotor and carrying the N-phase current to each coil of the stator, and
   a noise eliminating member arranged in an internal space of the current carrying device and connected with the coils of two coil phases.

2. A direct current motor according to claim 1, wherein the noise eliminating members are fixed to the current carrying device by adhesive material or by caulking.

3. A direct current motor according to claim 1, wherein the current carrying device comprises a plurality of plates, each of which corresponds to one coil phase of the stator, and one noise eliminating member is connected with each pair of adjacent plates.

* * * * *